United States Patent [19]

McAllister et al.

[11] Patent Number: 5,991,364
[45] Date of Patent: Nov. 23, 1999

[54] PHONETIC VOICE ACTIVATED DIALING

[75] Inventors: Alexander I. McAllister, Silver Spring, Md.; James E. Curry, Herndon; Robert D. Farris, Sterling, both of Va.

[73] Assignee: Bell Atlantic Network Services, Inc., Arlington, Va.

[21] Appl. No.: 08/828,781

[22] Filed: Mar. 27, 1997

[51] Int. Cl.[6] .................................................. H04M 1/64
[52] U.S. Cl. ................................. 379/88.01; 379/88.03; 379/229
[58] Field of Search .............................. 379/88.03, 88.02, 379/88.01, 230, 229

[56] References Cited

U.S. PATENT DOCUMENTS

| | | |
|---|---|---|
| 4,928,302 | 5/1990 | Kaneuchi et al. . |
| 4,961,211 | 10/1990 | Tsugane et al. . |
| 5,165,095 | 11/1992 | Borcherding . |
| 5,247,571 | 9/1993 | Kay et al. . |
| 5,297,183 | 3/1994 | Bareis et al. ................... 379/88.03 X |
| 5,369,685 | 11/1994 | Kero . |
| 5,452,344 | 9/1995 | Engelbeck et al. ............ 379/88.25 X |
| 5,479,489 | 12/1995 | O'Brien . |
| 5,572,583 | 11/1996 | Wheeler, Jr. et al. ............... 379/229 X |
| 5,712,903 | 1/1998 | Bartholomew et al. ............. 379/88.01 |

OTHER PUBLICATIONS

"Electronic Speech Recognition, Techniques, Technology and Applications", by Bristow, McGraw–Hill Book Company, 1986, pp. 26–27.

*Primary Examiner*—Creighton Smith
*Attorney, Agent, or Firm*—McDermott, Will & Emery

[57] ABSTRACT

A telephone communications system Advanced Intelligent Network (AIN) platform provides a voice activated call dialing functionality through speaker independent phoneme speech recognition having a minimum volume of storage without requiring user template training. Speaker independent phoneme recognition identifies phoneme strings of caller spoken utterances which are then compared to phoneme string representations that previously have been stored in respective caller processing records (CPRs) for those subscribers listed in the ISCP database, or stored in an equivalent peripheral database with which the ISCP can communicate. Each stored phoneme string representation is associated in the CPR with a destination telephone number that may then be extracted to route a call.

2 Claims, 5 Drawing Sheets

PHONETIC VOICE ACTIVATED DIALING

TECHNICAL FIELD

The present invention relates generally to communications networks that provide voice activated dialing and more particularly to the use of speaker independent phoneme recognition to determine call routing.

BACKGROUND ART

The relatively recent development of new and expanded telecommunication services has provided subscribers increased flexibility in the selection and use of the various features that have become available. These services are amenable to being tailored to specific requirements of the subscriber.

So-called "flash hook services," such as Call Waiting, Tone Block, 3-Way Calling, Call Transfer and Consultation Hold, are implemented using appropriate switch hook depression by the user. Other services, such as Return Call, Answer Call, Repeat Call, Priority Call, Call Trace, Per Call Blocking, Intercom Extra, Home Intercom, Speed Calling and Call Block, require various combinations of keyed DTMF inputs by the subscriber. Such inputs, for example, may be codes including special keys such as the * key in combination with a preset number sequence or dialing a dialed system telephone followed by further keyed input for purposes of identification or choice of options.

Flash hook services, while offering a wide range of communication customization, are particularly complex. Traditionally, depression of the switch hook disconnects a call. However, momentary switch hook depression with the newer flash hook services effects different results, such as connecting new callers. Without prompts and feedback from the system, inexperienced users tend to lose their ability to track their location while adding, transferring or dropping a caller in a multiple call, flash hook operation. Confidence is low in the ability to complete the service and the user often expects to lose the connection to the other party.

In addition to such disadvantages, the user of flash hook operations must be cognizant of the correct DTMF key combinations for each of the various services, the appropriate sequences for inputting key combinations in various complex services, and the appropriate responses from the communications network that either signal the next step in the process or verify completion of the process. A burden is placed on the subscriber to remember the appropriate activation and deactivation codes for the various subscribed services. Flash hook operations can be not only complex but time consuming.

These drawbacks extend to preprogrammable functions included in a subscriber's telephone equipment as well as those provided by the telecommunications system. For example, speed dial features that the user may set up when first obtained may be abandoned later when instructions are not at hand due to the complexity of the entry process. As a result, speed dial keys may not be fully populated or may include obsolete entries.

More recently, Common Channel Signaling has been utilized advantageously by the Advanced Intelligent Network (AIN) of the public switched telephone system to predefine services according to the subscriber's requirements and to implement such services for applicable calls. A description of an Advanced Intelligent Network (AIN) implementation may be found, for example, in U.S. Pat. No. 5,247,571 to Kay et al. Each central office of a network of interconnected central offices is connected to a number of local telephone lines constituting a specified group. Call routing is carried out in accord with data stored in the AIN database and with customer specified parameters, such as calling/called party number, time-of-day, day of the week, authorization codes, etc. After the central office switching system detects an off-hook, it determines whether or not the call originates from a subscribing line. If not, the system receives dialed digits and executes normal call processing routines. If the call is from a subscriber line, the originating office receives dialed digits, suspends the call and sends a query message to the Integrated Service Control Point (ISCP) through the Signaling Transfer Points (STP's). This query message, in Transaction Capabilities Applications Protocol (TCAP) format, identifies the calling station and the digits dialed as well as other pertinent information. Based on the identity of calling party's address, the ISCP retrieves from its database a table of trunk group routing information. The ISCP formulates a response message, again in TCAP format, including the routing information, and transmits the response message back to the originating central office via the STP(s). The system then executes normal call processing routines for completing the call using the received routing information provided by the ISCP.

The use of AIN reduces the number of DTMF entries that a subscriber must input as much of the information needed for providing the service has been stored in the AIN database. For those services that require a significant amount of caller input, interactive voice menus are used to prompt callers in a user friendly manner. Nevertheless, inherent drawbacks exist in situations in which the caller must provide DTMF input. The subscriber often finds it difficult to remember the proper DTMF representations of the required input, such as a multiplicity of telephone numbers and codes, and may be inconvenienced by the time and steps necessary to follow a menu driven procedure in order to complete the desired service.

The use of speech recognition is an attractive approach to alleviate such annoyances. As the development of commercially available speech recognition systems has progressed, voice responsive features have been provided in telephone services. Prior examples of telephone devices that are responsive to caller voice input to dial a call to a corresponding destination are U.S. Pat. No. 4,928,302, issued to Kaneuchi et al., and U.S. Pat. No. 4,961,211, issued to Marui et al. The Marui et al. device is a mobile telephone apparatus that makes an outgoing call in response to the caller speaking a number that corresponds to the destination telephone number. The telephone number is read out from stored telephone numbers and is then dialed. When a number has been identified, it is synthesized and displayed so that the user can determine if it is the correct number. In the Kaneuchi et al. device, standard patterns are associated with registered telephone numbers.

U.S. Pat. No. 5,165,095, issued to Borcherding, and U.S. Pat. No. 5,369,685, issued to Kero, disclose voice activated dialing systems in which remote databases are referenced. In the Borcherding arrangement, a local database contains speaker independent voice recognition templates for various command functions and a remote database in which speaker dependent templates are stored. The latter templates represent phrases associated with destination telephone numbers. If a dial command is spoken by a caller, a local database containing speaker independent speech recognition templates is accessed. The templates of this local database are compared to a dial command so that dialing instructions can be recognized and executed. The caller is identified and speaker dependent templates for the identified caller are downloaded from the remote database. The speaker dependent templates are then accessed. A spoken destination identifier is compared with the speaker dependent templates and when a match is found, the destination telephone number is dialed.

In the Kero arrangement, a voice activated telephone directory and call placement system accessible over a telecommunications network allows a caller to store a personalized telephone directory and to retrieve selected directory listings therefrom by speaking a series of voice entries. A plurality of subdirectories are formed to complete the listings. A call-spoken entry received over the network is compared with a previously stored voice template of the caller speaking the name of a subdirectory that is included as part of the caller's personalized telephone directory. If a match with a subdirectory name template is made, a subsequent caller-spoken entry received over the network is compared to a voice template of listings in the subdirectory. The system retrieves the destination telephone number associated with the directory listing if a match is found and the call may then be completed. Each subdirectory may include subordinate levels of subsidiary directories, each having a plurality of listings.

Speech responsive dialing systems such as those of the prior art exemplified above have inherent limitations. The large storage required for templates of either speaker dependent recognition or speaker independent recognition vocabularies is a restrictive factor as the number of users and the vocabulary size increase.

Development of speaker independent templates involves, for each vocabulary word, the input from many diverse speakers in order to provide reliably accurate recognition. Such templates occupy a large volume of storage. As recognition must accommodate speakers of different accents, inflections, and pronunciation, the size of the word vocabulary must be limited to avoid confusion among similar words. A small number of words may be recognized with confidence, while a large number would give an unacceptably erratic response. In addition, provision must be made in the system to distinguish between use by different callers of the same word, for example "mom," for different destinations.

Speaker dependent recognition requires developing templates for each user. While these templates individually would occupy less storage volume than speaker independent templates for corresponding words, templates must be trained and stored for each word to be used by each user. Users in the same household who would use the same vocabulary word for the same destination number nevertheless would be required to go through a template training process. Moreover, in order to access the appropriate templates, provision must be made in the system for identifying the particular user.

DISCLOSURE OF THE INVENTION

Accordingly, an advantage of the present invention is a voice activated dialing service that provides to a subscriber a user friendly environment requiring little user input in establishment of the service.

Other advantages of the invention are that speaker independent phoneme speech recognition, as used in the invention, requires a minimum volume of storage while eliminating the need for user template training. As the amount of storage is substantially reduced compared to prior art arrangements, the number of subscribers need not be limited.

These and other advantages of the invention are satisfied, at least in part, through the use of the Advanced Intelligent Network (AIN) Platform. A detailed description of an AIN system, suitable for implementation in connection with the present invention, is provided in the aforementioned U.S. Pat. No. 5,247,571, the disclosure of which is incorporated herein by reference.

The AIN conventionally provides services based on feature logic and data located at a centralized node in the network known as a Service Control Point (SCP) or as an Integrated Service Control Point (ISCP). Network switches appropriately equipped, known as Service Switching Points (SSP's), communicate with the ISCP and together provide various AIN services. The SSP determines which calls require AIN service based on characteristics of the call, such as the line it originated from or the digits that were dialed.

The process of identifying calls that require AIN processing is known as "triggering," since a particular characteristic of the call "triggers" a switch to provide AIN treatment. Once a trigger occurs, a query message is sent to the ISCP asking for instructions. Based on information contained in the query message, the ISCP determines which service is being requested and provides appropriate information such as routing and billing instructions that the SSP then executes to complete the call. ISCP, through a lookup in its database, determines which service is being performed on a particular call. The SSP simply identifies calls that require AIN processing and executes instructions provided by the ISCP.

Current program controlled switches such as the AT&T 5ESS and 1AESS and comparable switches from other manufacturers are provided with an Advanced Services Platform (ASP) that provides SSP and Network Access Point (NAP) capabilities. ASP provides services independent triggering and call processing capabilities and also supports Operations, Administration and Maintenance (OA&M). These capabilities interact with many existing switch based features. SSP capabilities enable end offices and access tandem offices to interface with SCP databases using Common Channel Signaling 7 (CCS7) Transaction Capabilities Application Part (TCAP) protocol to implement services. These services include standard equal access multi-frequency (EAMF) and CCS7-ISDN user part (ISUP) interfaces to a network access point (NAP) switch, standard CCS7-TCAP interfaces to an SCP database, call processing triggers, non-call processing triggers such as test queries, customized announcements under the control of an ISCP, such as terminating announcement or play announcement and collect digits, connection control under control of the ISCP, business and residence custom services (BRCS) interworking, new terminating restrictions, ISDN interworking, notification of call termination (returned to ISCP), enhancements for OA&M, and billing under control of the SCP. Signaling in LATA switching systems is described in detail in Bell Communications Research Technical Reference TR-TSY-000506, July 1987. Further details are provided in AT&T 235-190-125 October, 1990.

The present invention employs speaker independent phoneme recognition to identify phoneme strings in caller spoken utterances and compares the recognized strings to those that previously have been stored in respective caller processing records (CPRs) for subscribers listed in the ISCP database, or stored in an equivalent peripheral database with which the ISCP can communicate. Each stored phoneme string representation is associated in the CPR with a destination telephone number that may then be extracted to route a call. Alternatively, the phoneme stored in the peripheral database may be converted to a destination telephone number that is then transmitted to the ISCP to route the call.

Phonemes are the distinctive elements that a language can combine to form different words. Any language utilizes a comparatively small set, often less than fifty, of phonemes from which words can be built. Any two phonemes, by definition, contrast with each other in the sense that they can be distinguished from each other, and thereby used to distinguish words. To represent phonemes unambiguously, standard systems of phonemic transcription have been established. While it is possible to represent each phoneme with a number, or an invented symbol of unique shape, standard phoneme tables adopt familiar letter shapes, adding a few more characters where necessary. Reference is made to "Electronic Speech Recognition, Techniques, Technology & Applications," by Bristow, McGraw-Hill Book Company, 1986, more particularly at pages 26 and 27, for exemplification of a standard phoneme table.

The present invention takes advantage of commercially available automatic speech recognizers (ASR's), which are essentially acoustic pattern recognizers, to use speaker independent representations of each of the relatively few phonemes in a feasible manner. This use is in contrast to a speaker dependent device that will only recognize correctly the utterances of one individual at a time. With speaker dependent technology, such individual will have 'trained' the device by previously supplying it with acoustic reference patterns in his/her own voice.

In the present invention, the speaker independent phoneme patterns will have been trained by the manufacturer, with data representing a composite reference voice derived from a number of different voices. Phonetic models are thus provided without the need for each subscriber to go through a process of training the recognition device. The subscriber's voice is used only for recognition. In use, the ASR will recognize the phonemes of which the speaker utterances are comprised and translate the recognized phonemes into character representations such as those of the standard phoneme table. Each character is in the order of eight bytes of storage. As phonemes are distinguishable from each other, an acceptable rate of recognition accuracy is provided while minimizing required storage volume.

Storage of phoneme strings for voice activated dialing, with associated destination numbers, may take place at the outset of the service or thereafter. A list of several entries can be developed by one or more callers at a subscriber line in a single session. Thereafter, the associated central switching office is set to recognize, upon an off-hook condition of the subscriber line, that outgoing calls can be processed by voice activation or in the standard manner per DTMF or pulse input. If a voiced utterance does not match the stored phoneme strings, the caller may be prompted for a destination telephone number and be given an option to add the phoneme string with associated telephone number to the CPR or peripheral database in addition to completing the call.

When a call is to be made from the subscriber line, an off-hook condition can trigger the central office to switch the call over a voice line or a T1 line to a platform that will recognize dialed digits or a spoken phrase and, in the latter instance, determine the corresponding telephone number. The destination telephone number is transmitted through the ISCP back to the switch, which then will route the call accordingly.

In a preferred embodiment, the central office switching facility includes speech independent recognition capability as well as the standard universal tone receiver (UTR). Outgoing calls dialed in typical manner, such as by DTMF or pulse input, are processed conventionally. Voice dialing is recognized by an automatic speech recognizer in the central office or on an AIN/IP platform. This event triggers the AIN network wherein the recognized phonemes of the spoken utterance is digitized and transmitted in a message over a common channel signaling path by the central office to the ISCP. The ISCP identifies the calling subscriber line from information contained in the message, such as calling party Automatic Number Identification (ANI), to access the appropriate CPR. The call destination information is thereby obtained and transmitted to the central office through the common channel signaling network to route the call. The ISCP generates any necessary instructions for interactivity with the caller if the recognized phonemes do not match the phoneme strings stored in the CPR. In the peripheral database embodiment, recognized phonemes of the spoken utterance are processed and translated into a destination telephone number which is transmitted to the ISCP for call routing.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

One system for providing a Common Channel Signaling Network (CCSN) utilizes Signaling System 7 (SS7) protocol in a Packet Switched Data Network (PSDN) connecting Network Elements (NE) via packet switched 56 Kb digital data circuits. In addition to providing call set signaling functions, the SS7 network also provides access to switching control points (SCP) used to permit line identification database (LIDB) look-up for 800 services. Class services also use the SS7 network to provide custom call features. The latest services using the SS7 network comprise Advanced Intelligent Network (AIN) services. AIN services use the SS7 network to access an Integrated Switching Control Point (ISCP) where AIN service functions are performed.

Figure 1:
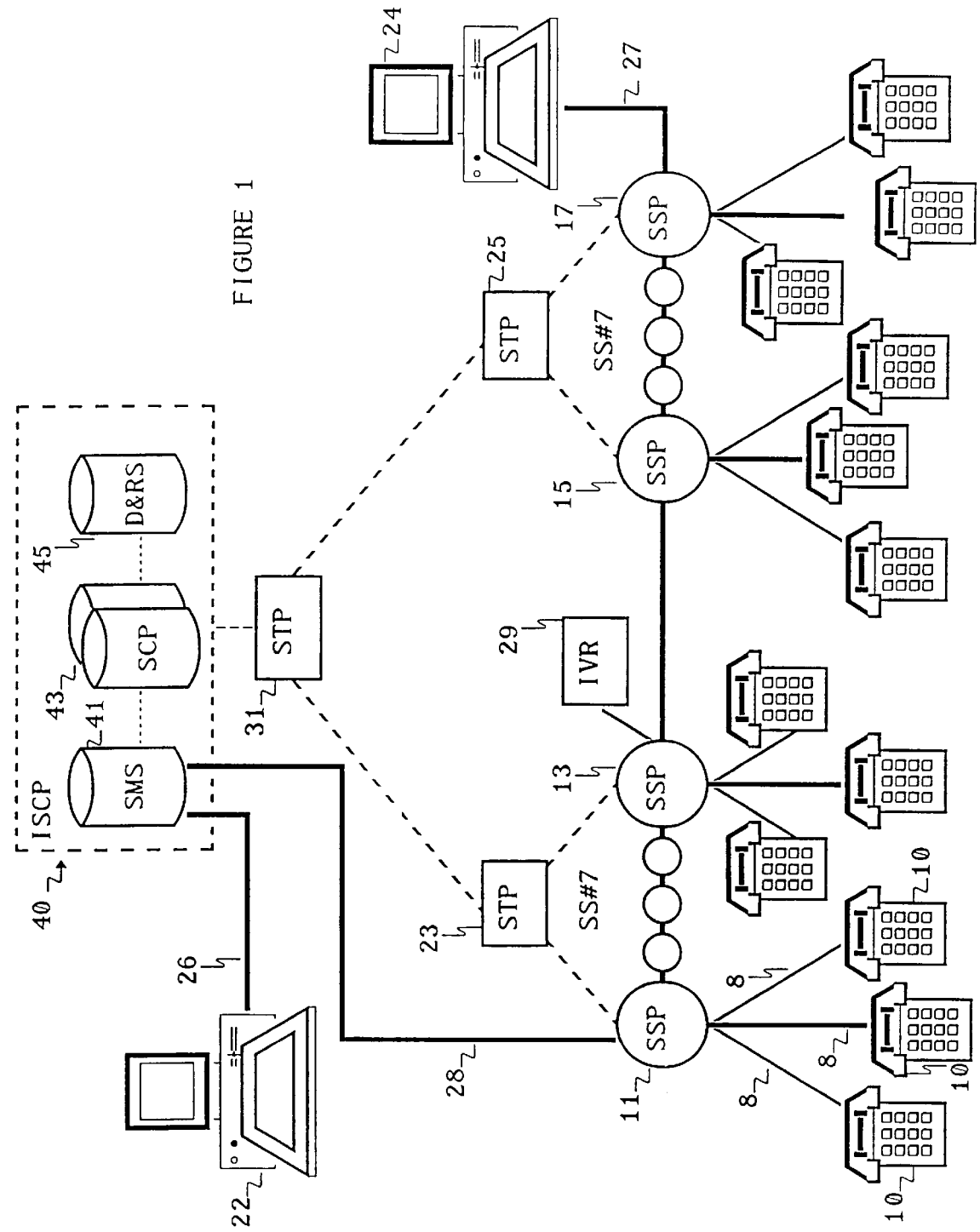
FIG. 1 is a block diagram of a Public Switched Telephone Network and its SS7 signal control network as used in the present invention.

FIG. 1 is a diagram of a common channeling signaling network using SS7 protocol. Common channel signaling uses an out of band signaling path that is separate from the path used for voice transmission. This signalling technology provides for faster call set-up times and a more efficient use of the voice network than prior manual signaling, dial pulse signaling or multi-frequency signaling schemes wherein the trunk connecting the calling and the called subscribers required both signaling and voice transmission over the same circuitry. When a call is placed, the voice communication is suspended while signaling is transmitted through the common channel signaling network to check whether the line at the destination switch is busy and to determine the voice connection path.

Local telephone lines are connected by individual telephone stations 10 in each geographic area to a Service Switching Point (SSP) which may be included in the closest CO. Each CO connects via trunk circuits to one or more of the other COs, and each CO has a CCIS data link to a Switching Transfer Point (STP). Redundant STPs are provided for backup reliability. The trunk circuits carry large numbers of telephone calls between the CO's.

Control logic and feature data are located at a centralized node in the network called a Service Control Point (SCP). SSPs communicate with the SCP through the associated STP. B-link or D-link lines interconnect STPs, while A-link lines interconnect the STPs with either SCPs or SSPs.

If a call requires a feature service such as call redirection, an SSP is triggered to communicate with an SCP on the basis of the call characteristics, such as originating line or dialed digits. If a trigger occurs, a query message is sent to the SCP to obtain instructions. The SCP, if provided with appropriate database storage and processing capability, can determine the nature of the service and information appropriate to routing of the call. Redirection of the call can be signaled through the STP(s) to seize a trunk circuit between the originating CO and the redirected destination CO.

All of the CO's 11, 13, 15 and 17 in the illustrated embodiment are equipped and programmed to serve as SSPs. Such central office switching systems typically consist of a programmable digital switch with CCIS communications capabilities. One example of such a switch is a 5ESS type switch manufactured by AT&T. Other vendors, such as Northern Telecom and Siemens, manufacture comparable digital switches. SSPs are appropriately equipped programmable switches present in the telephone network, which recognize AIN type calls, launch queries to the ISCP and receive commands and data from the ISCP to further process the AIN calls. In instances in which the SSP functionality is not present in the CO, end offices without such functionality forward calls to an SSP at its prescribed point in the network.

The SSPs 11 and 13 connect to a first local area STP 23, and the SSPs 15 and 17 connect to a second local area STP 25. The connections to the STPs are for signalling purposes. As indicated by the circles between SSPs, within the local areas of STPs 23 and 25, each local area STP can connect to a large number of SSPs. The central offices or SSPs are interconnected to each other by trunk circuits for carrying telephone services.

The local area STPs 23 and 25, and any number of other such local area STPs, communicate with an STP 31 associated directly with an ISCP 40 to serve the entire area. The STP hierarchy can be expanded or contracted to as many levels as needed to serve appropriately subscriber demand. The links between the COs and the local area STPs are dedicated CCIS links, typically SS7 type interoffice data communication channels. The local area STPs are in turn connected to each other and to the regional STP 31 via a packet switched network. The regional STP 31 also communicates with the ISCP 40 via a packet switched network.

The ISCP 40 is an integrated system. Among other system components, the ISCP 40 includes a Service Management System (SMS) 41, a Data and Reporting System (DRS) 45 and the actual database or Service Control Point (SCP) 43. The ISCP also typically includes a terminal subsystem referred to as a Service Creation Environment or SCE (not shown) for programming the data base in the SCP 43 for the services subscribed to by each individual business customer. Separate communication lines 26 and 28, respectively, are connected between SMS 41 and an external processing system 22 and between SMS 41 and an SSP shown, for example, as SSP 11.

The messages transmitted between the SSPs and the ISCP are all formatted in accord with the Transaction Capabilities Applications Protocol (TCAP). The TCAP protocol provides standardized formats for various query and response messages. Each query and response includes data fields for a variety of different pieces of information relating to the current call. An initial TCAP query from an SSP includes, among other data, a "Service Key" which is the calling party's address and digits representing the called party address. The TCAP specifies a number of additional message formats, for example a format for a subsequent query from the SSP, and formats for "INVOKE" responses for instructing the SSP to play an announcement or to play an announcement and collect digits. For a detailed description of signaling in LATA switching systems reference is made to the aforementioned Bell Communications Research Technical Reference TR-TSY-000506.

Each central office switching system normally responds to a service request on a local communication line connected thereto to selectively connect the requesting line to another selected local communication line. The connection can be made locally through only the connected central office switching system if the originating location and the destination location are served by the same central office switch. When the called line connects to a distant station, the connection is made, for example, through the connected central office switching system SSP 11 and at least one other central office switching system SSP 13 through the telephone trunks interconnecting the two COs.

The network includes interactive voice response (IVR) capability provided either within a central office or externally thereto, the latter illustratively shown as IVR 29. Additionally, external adjunct processing capability may be provided for a central office as illustrated by the connection 27 between SSP 17 and processor 24. This processor is known as an intelligent peripheral (IP) device. Direct communication between the IP and the ISCP can be provided.

Figure 2:
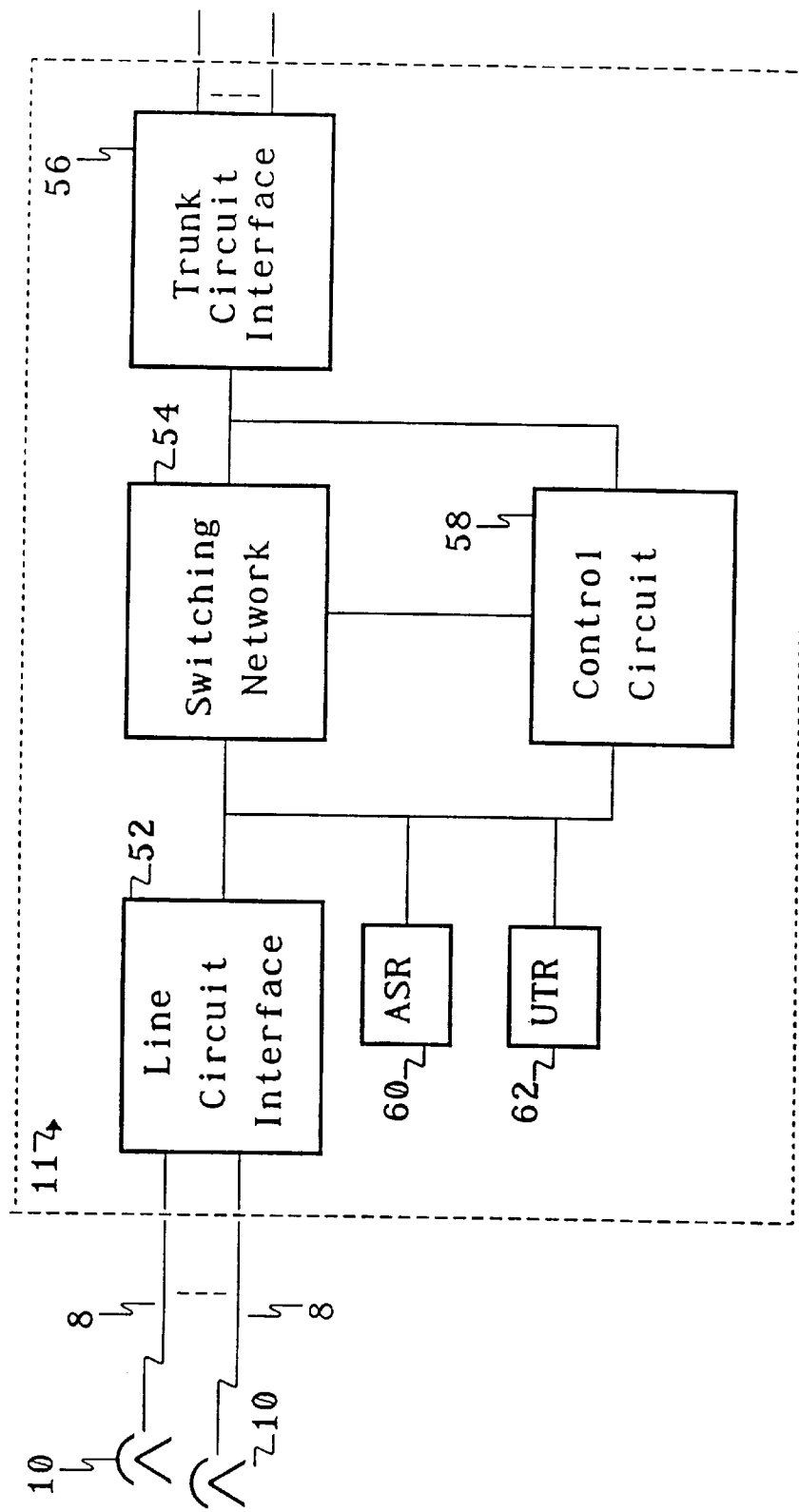
FIG. 2 is a simplified block diagram of a central office switching facility having speaker recognition capability in accordance with the present invention.

FIG. 2 is a simplified block diagram of a central office facility such as SSP 11 in accordance with a preferred embodiment of the invention wherein speech recognition functionality is included within the SSP. Subscriber stations 10 are connected by subscriber lines 8 to line interface circuit 52. This circuit connects all subscriber lines to switching network 54 whereby calls are completed through appropriate communication paths between local subscriber lines or between local lines and trunks through trunk circuit interface 56. Control circuit 58 provides various service and supervisory functions that are required for normal operation. Broadly included therein are conventional elements, for example, dial tone generators, busy tone generators, ringback tone generators, and various announcement platforms.

Connected in parallel to the line circuit interface are automatic speech recognizer (ASR) 60 and universal tone receiver (UTR) 62. ASR may comprise any of the commercially available recognizers, such as described in the aforementioned Bristow publication, at pages 216–233, or at pages 236–242 of Volume 17 of McGraw-Hill Encyclopedia of Science and Technology, seventh edition. UTR 62 is a conventional tone recognizer that registers dialed digits.

Figure 3A:
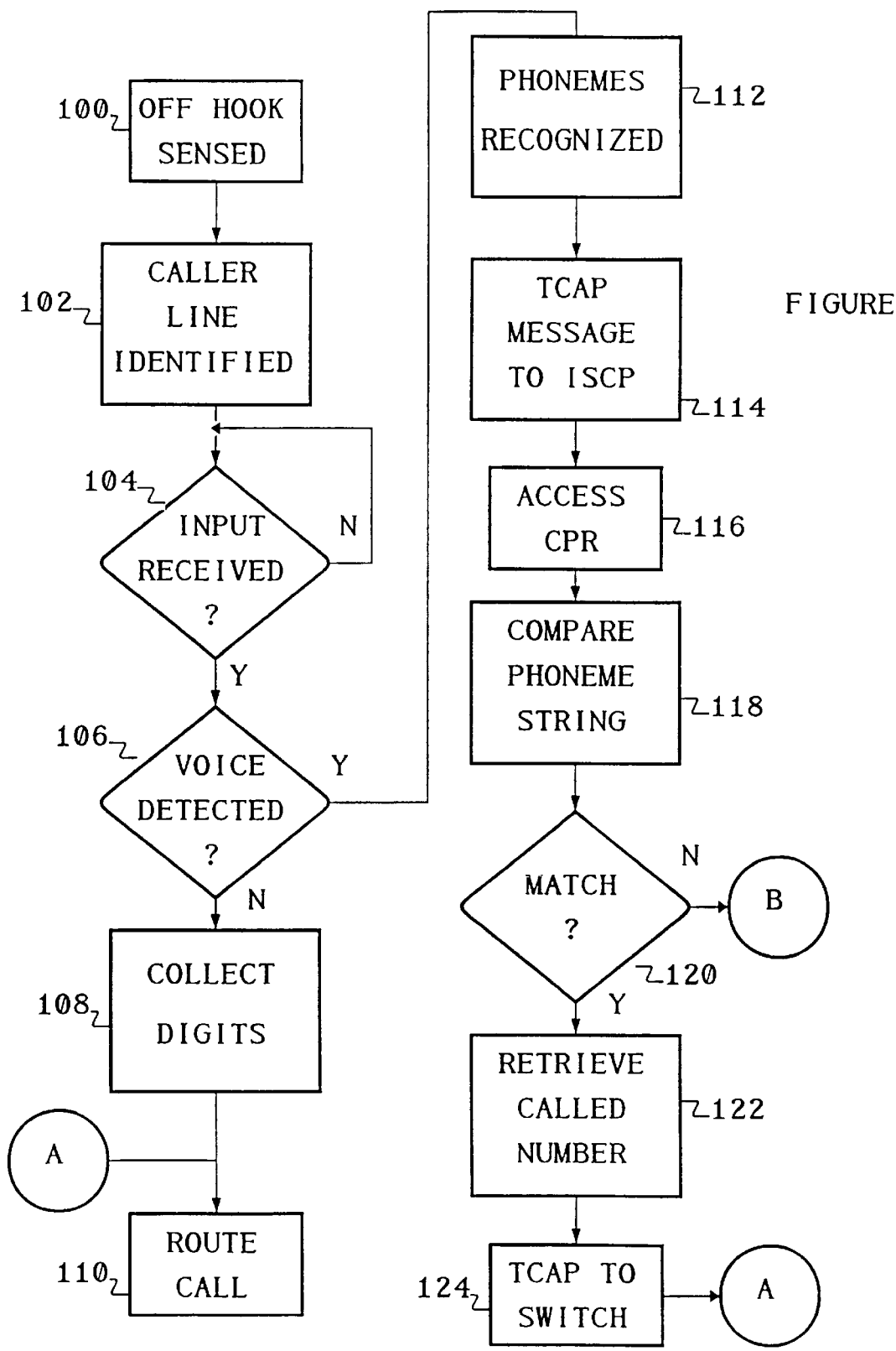
FIGS. 3A and 3B are flow chart diagrams of voice activated dialing operation in accordance with the preferred embodiment of FIGS. 1 and 2.
Figure 3B:
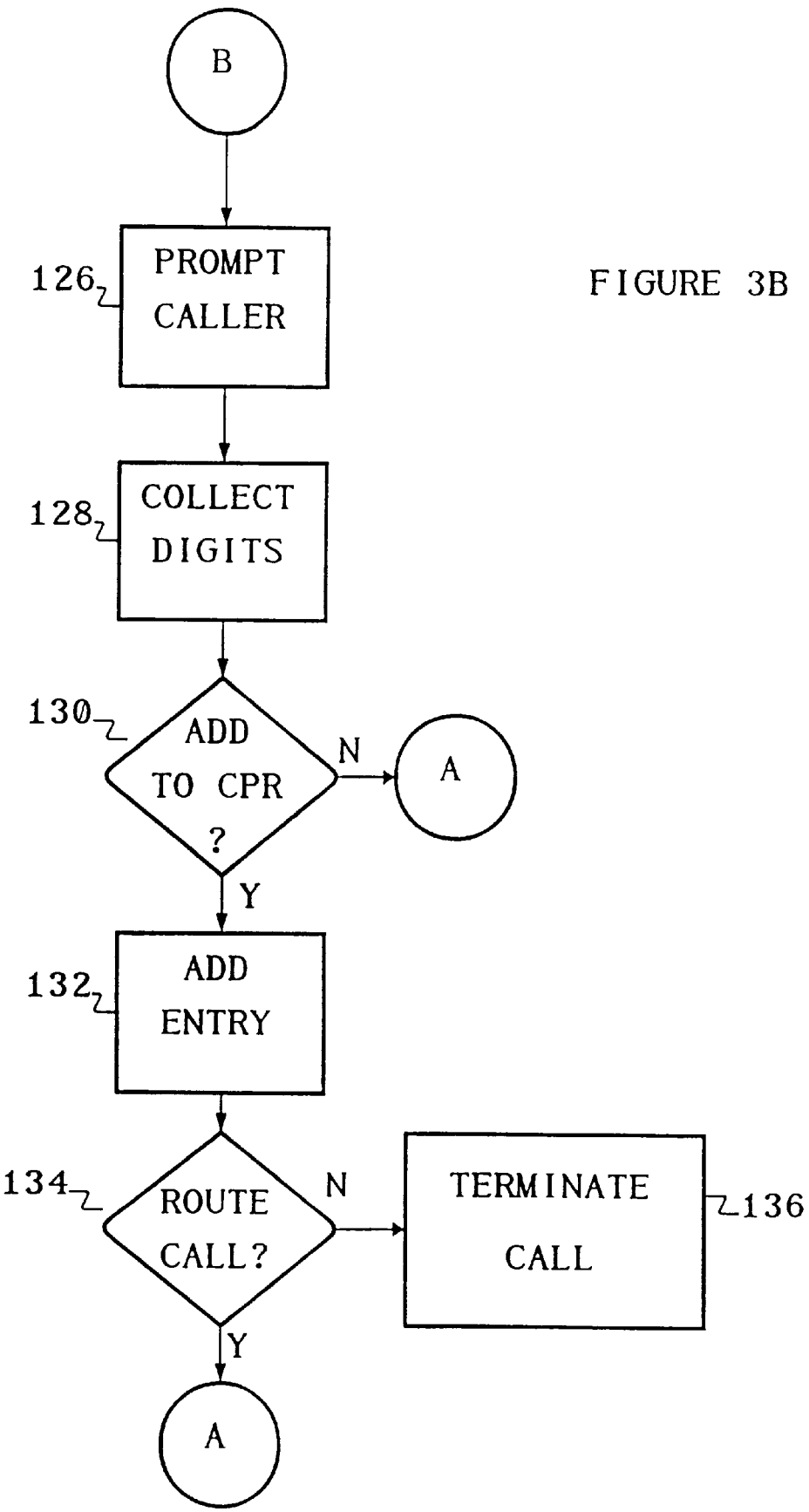

Operation of the voice activated dialing arrangement embodied in FIGS. 1 and 2 is described with respect to the flow charts shown in FIGS. 3A and 3B. Upon going off hook, the subscriber line condition is sensed at the central office at step 100. The calling subscriber line is identified at step 102. At step 104, determination is made whether input has been received from the subscriber line at the central office. If so, step 106 determines whether voice has been detected by the ASR. If voice has not been detected the UTR collects received digits at step 108 and the call is then routed to the dialed destination at step 110 in conventional manner.

If voice detection occurs in step 106, the ASR recognizes and digitizes the phonemes of the spoken utterance at step 112. The SSP then formulates a digital message that includes calling line identification as well as the digitized phoneme string, at step 114, and transmits the message over a common channel signaling path to the ISCP. The ISCP accesses the CPR that corresponds to the identified calling line at step 116 and compares the received digitized phoneme string with the phoneme strings stored in the accessed CPR, at step 118. If a match is determined in step 120, the destination telephone number is retrieved from the CPR at step 122 and transmitted in an SS7 message back to the SSP at step 124. The call is then routed to the destination.

If there has been no phoneme string match in step 120, an announcement is transmitted from an IVR platform to the caller at step 126. The announcement indicates that the voiced phrase is not currently in the CPR list and prompts the caller to input the call destination number. Either DTMF, speech or pulse signals can be handled. The caller is also prompted to indicate whether the entry is to be added to the CPR list and whether the call is to be routed to the destination.

Dialed digits for the call are collected by the UTR register at step 128. If it is determined at step 130 that the caller does not want to add the phrase and number as an additional entry to the CPR listing, the call is then routed to completion. If the entry is to be added, the ISCP updates the CPR accordingly at step 132. At step 134 it is then determined whether the call is to be completed to the identified destination, in addition to the CPR update function, or whether the current call was only for the purpose of adding the entry to the CPR. If the call is not to be completed, it is terminated in step 136. Otherwise, the call is routed to the destination.

As can be seen from the above described operation, the arrangement provides the calling subscriber with flexibility and simplicity of use. With any call, the subscriber has the options of simply voice dialing to a destination that currently exists in the CPR list, or adding a new entry to the list, with or without completing the call. The caller merely utters a destination phrase and, only in the case of a new entry, enter by DTMF keys the destination number and option responses. As a further convenience, the prompt announcement may give the option of adding additional entries so that a single call can be used as a session for populating the CPR list.

In an alternative embodiment, the database may be stored in an intelligent peripheral device (IP) at a location remote from the ISCP and SSPs. In operation, the ISCP would access the IP either directly through a common channel signaling path or through the SSP.

Figure 4:
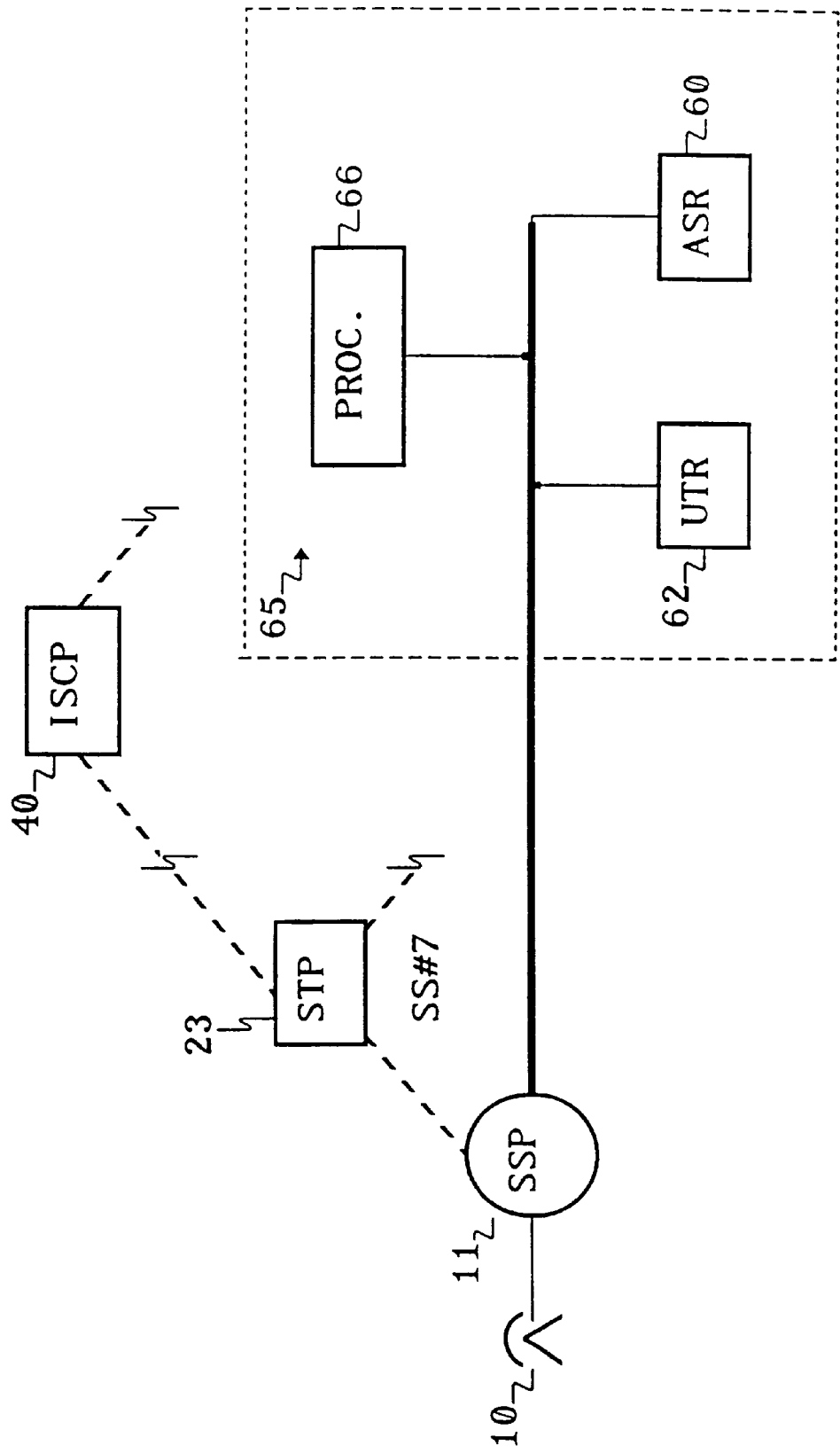
FIG. 4 is a simplified block diagram of another alternative embodiment.

FIG. 4 is a simplified block diagram of another alternative embodiment. A remote platform 65, linked to SSP 11 and other network SSPs by a voice line or T1 line, includes ASR 60, UTR 62 and processor 66. The processor comprises storage that accommodates listing of phoneme strings with associated destination telephone numbers for each subscriber line. For each position 10 that subscribes to the voice activated dialing service, an off-hook trigger is set at the associated central office SSP 11. Upon sensing off-hook initiation on the line, the SSP issues a TCAP query message, including calling line identification, to the ISCP. Through access to its database, the ISCP determines that the call is a voice activated dialing subscriber call and returns a message to the SSP to switch the line to connect with platform 65. As previously described, UTR 62 will receive and register dialed digits and ASR 60 will recognize a spoken utterance and produce a digitized string. Under control of processor 66, if dialed digits are received, the destination number information will be transmitted to the SSP for switching the calling line and routing to the identified destination. If, instead, a digitized phoneme string is produced by ASR 60, the string is compared with phoneme strings stored in the database of processor 66 for the calling subscriber line. If a match occurs, the destination number is identified and signaled to the SSP for routing the call to completion. If a match does not occur, similar options as those of the preferred embodiment are provided to the caller in an announcement message handled by an IVR at the platform.

In this disclosure there is shown and described the preferred embodiment of the invention and but a few examples of its versatility. The following advantages result from the described invention. The end user can control speaker independent programming of his or her own list. Names added in this manner can be utilized by all users of the telephone since the technology is speaker independent. Recognition for an individual line can be enhanced through prompting a caller to add a new destination number or create a synonym name for an existing destination number. Overall system performance is improved compared to existing systems that utilize combinations of speaker dependent and speaker independent technologies. Such systems are prone to difficulty resulting from complexities necessary to determine which recognition technology to use at particular stages of a call. In contrast, the invention uses a single speaker independent recognition technology that acts upon phoneme units rather word or phrase vocabularies. It is to be understood that the invention is capable of use in various other combinations and environments and is capable of changes or modifications within the scope of the inventive concept as expressed herein.

We claim:

1. In a telephone switching system having a plurality of subscriber lines, a method for routing outgoing calls comprising the steps of:

sensing an off-hook condition on a subscriber line at an associated switching location and identifying the calling subscriber line;

speaker independently recognizing, at said associated switching location, a string of phonemes of which a voiced utterance from a caller on said line is comprised;

accessing, at a service control point that serves a plurality of system switches, a call processing record (CPR) associated with the identified subscriber line from a database containing a plurality of subscriber call processing records, each call processing record having at least one entry;

comparing, at said service control point, the recognized string of phonemes with phoneme strings contained in the call processing record;

transporting a destination telephone number contained in an entry of the CPR that corresponds to the recognized string of phonemes, in response to a comparison match in said comparing step, from the service control point to said switching location;

routing the call to the destination in response to receipt of the transported destination telephone number at the switching location;

obtaining from the caller a destination telephone number for the voiced utterance in response to a non-match in said comparing step; and routing the call to the obtained destination telephone number;

wherein said step of obtaining includes receiving DTMF input from the caller; and further including the steps of:

prompting the caller to indicate whether the voiced utterance and associated destination telephone number is to be placed in a new entry in the CPR; and in response to a positive indication from said prompting step, adding the new entry in the CPR.

2. In a telephone system having a plurality of subscriber lines having respective telephone numbers, a method for processing a telephone call comprising the steps of:

sensing an off-hook condition on a calling subscriber line;

recognizing a voiced utterance from a caller on said line;

accessing a call processing record (CPR) corresponding to the subscriber line from a database containing a plurality of subscriber call processing records, each call processing record having at least one telephone number entry associated with a voice pattern;

routing the call to a destination having a telephone number that corresponds to an entry of the accessed CPR in response to a match thereof with the recognized utterance;

obtaining from the caller a destination telephone number for the voiced utterance in response to a non-match with the accessed CPR; and adding a new entry in the CPR that associates the obtained destination telephone number with the recognized voiced utterance;

wherein said obtaining step comprises receiving voice input that identifies the telephone number.

* * * * *